United States Patent
R N et al.

(10) Patent No.: US 11,763,555 B2
(45) Date of Patent: Sep. 19, 2023

(54) SYSTEM AND METHOD FOR GROUND OBSTACLE DETECTION AND DATABASE MANAGEMENT

(71) Applicant: Honeywell International Inc., Charlotte, NC (US)

(72) Inventors: Gireesh Kumar R N, Karnataka (IN);
Kapil Rathi, Karnataka (IN);
Ashanand Hans, Karnataka (IN);
Supriya Mallick, Karnataka (IN);
Kapil Kulkarni, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 161 days.

(21) Appl. No.: 17/339,821

(22) Filed: Jun. 4, 2021

(65) Prior Publication Data
US 2022/0343094 A1      Oct. 27, 2022

(30) Foreign Application Priority Data
Apr. 22, 2021   (IN) .............................. 202111018596

(51) Int. Cl.
*G06V 20/13*   (2022.01)
*G06V 10/94*   (2022.01)
*G06V 10/46*   (2022.01)
*G06F 18/22*   (2023.01)

(52) U.S. Cl.
CPC .............. *G06V 20/13* (2022.01); *G06F 18/22* (2023.01); *G06V 10/462* (2022.01); *G06V 10/95* (2022.01)

(58) Field of Classification Search
CPC ...... G06V 20/13; G06V 10/462; G06V 10/95; G06V 10/70; G06V 10/751; G06V 20/58; G06F 18/22
See application file for complete search history.

(56) References Cited

U.S. PATENT DOCUMENTS

| | | |
|---|---|---|
| 6,317,690 B1 | 11/2001 | Gia |
| 8,082,102 B2 | 12/2011 | Ravenscroft |
| 8,258,983 B2 | 9/2012 | Conner et al. |
| 8,755,954 B1 | 6/2014 | McCusker et al. |
| 9,513,371 B2 | 12/2016 | Zhang et al. |

(Continued)

FOREIGN PATENT DOCUMENTS

EP         0436213 A2      7/1991

*Primary Examiner* — Aaron W Carter
(74) *Attorney, Agent, or Firm* — Bookoff McAndrews, PLLC

(57) ABSTRACT

Disclosed are methods, systems, and computer-readable medium for obstacle detection and database management using multi-source weightages. For instance, the method may include: responsive to a detection of an object, determining whether the object is a known object or an unknown object based on object features and known objects indicated by vehicle state information and an obstacle database; responsive to a determination that the object is an unknown object, updating the obstacle database with unknown object information and transmitting the unknown object information to an off-board service; receiving a response from the off-board service, the response including a weightage assigned to the unknown object; updating the obstacle database with the weightage assigned to the unknown object; and performing at least one action based on the weightage of the unknown object.

20 Claims, 9 Drawing Sheets

(56) References Cited

U.S. PATENT DOCUMENTS

| | | |
|---|---|---|
| 9,524,647 B2 | 12/2016 | Kohn-Rich |
| 9,632,505 B2 | 4/2017 | Hickerson et al. |
| 9,747,808 B2 | 8/2017 | Chambers et al. |
| 10,089,894 B1 | 10/2018 | Chandrashekarappa et al. |
| 10,332,405 B2 | 6/2019 | Kopardekar |
| 10,553,122 B1 | 2/2020 | Gilboa-Amir et al. |
| 10,860,115 B1 | 12/2020 | Tran |
| 2004/0158355 A1 | 8/2004 | Holmqvist et al. |
| 2006/0253231 A1 | 11/2006 | Khatwa |
| 2009/0009306 A1 | 1/2009 | Magane et al. |
| 2017/0076616 A1 | 3/2017 | Kanade et al. |
| 2019/0019418 A1 | 1/2019 | Tantardini et al. |
| 2019/0019423 A1* | 1/2019 | Choi ................... G08G 5/0086 |
| 2019/0187720 A1* | 6/2019 | Fowe .................. G06F 16/583 |
| 2019/0196007 A1 | 6/2019 | Fucke et al. |
| 2020/0035110 A1* | 1/2020 | Priest .................... G06V 20/13 |
| 2020/0108946 A1* | 4/2020 | Harris ................... B64D 47/08 |
| 2020/0118451 A1* | 4/2020 | Dawson-Townsend ..................... G06V 20/10 |
| 2021/0082208 A1 | 3/2021 | Surace |
| 2021/0082295 A1* | 3/2021 | Surace ................ G08G 5/0021 |
| 2021/0096561 A1* | 4/2021 | Thomassey ............ G01S 17/08 |
| 2021/0197802 A1* | 7/2021 | Yoon ................ G08G 1/096816 |
| 2021/0255616 A1* | 8/2021 | Surace ................... G08G 5/003 |
| 2021/0407303 A1* | 12/2021 | Yogesha .............. G05D 1/1062 |
| 2022/0024428 A1* | 1/2022 | Yang ................. B60W 60/0011 |
| 2022/0080996 A1* | 3/2022 | Brown .............. G08G 1/09623 |
| 2022/0081004 A1* | 3/2022 | Brown ............. B60W 60/0015 |
| 2022/0309931 A1* | 9/2022 | T .............................. B60L 58/12 |
| 2022/0309934 A1* | 9/2022 | Panchangam ........ G08G 5/0082 |
| 2022/0335841 A1* | 10/2022 | Huncha ............... G08G 5/0034 |
| 2022/0335842 A1* | 10/2022 | Thiyagarajan ............ G08G 5/02 |
| 2022/0343094 A1* | 10/2022 | R N ..................... G06V 10/462 |

* cited by examiner

SYSTEM AND METHOD FOR GROUND OBSTACLE DETECTION AND DATABASE MANAGEMENT

CROSS-REFERENCE TO RELATED APPLICATION(S)

This patent application claims the benefit of priority under 35 U.S.C. § 119 from Indian Patent Application No. 202111018596, filed on Apr. 22, 2021, the contents of which is incorporated by reference in its entirety.

TECHNICAL FIELD

Various embodiments of the present disclosure relate generally to obstacle detection and database management and, more particularly, to obstacle detection and database management using multi-source weightages.

BACKGROUND

Aircraft, such as urban air mobility (UAM) vehicles, need to navigate in complex environments and avoid obstacles and terrain. Such navigation is necessary to maintain safety and efficient route planning. For instance, onboard terrain awareness and warning systems use databases (e.g., obstacle and terrain databases) to avoid obstacles and terrain. The databases may be updated and released periodically by database suppliers. As the environments UAM vehicles operate in are constantly changing, new obstacles may be encountered between database release periods. Terrain awareness and warning systems may not issue alerts for such obstacles, as the database may not include the obstacle encountered. Therefore, there are flight safety risks associated with new obstacles, as only direct sensing (e.g., visual detection by a pilot or by automated systems onboard the vehicle) of the obstacle may enable the terrain awareness and warning systems to alert and avoid the new obstacle.

Moreover, transmission of database updates may consume communication bandwidth and updates to databases (e.g., additions for new obstacles) may consume scarce onboard storage resources. Therefore, conservation of communication bandwidth (and cost associated therewith) and onboard storage capacity may be an additional challenge.

Additionally, as the environment is constantly changing, navigation may be inefficient (e.g., take longer or go further). Therefore, there may be an additional challenge to provide efficient navigation.

The present disclosure is directed to overcoming one or more of these above-referenced challenges.

SUMMARY OF THE DISCLOSURE

According to certain aspects of the disclosure, systems, methods, and computer-readable medium are disclosed for obstacle detection and database management.

For instance, a method may include: obtaining vehicle state information for a vehicle, the vehicle state information including position, speed, heading, and/or orientation data for the vehicle; obtaining sensor data from one or more sensors onboard the vehicle; the one or more sensors scanning an environment external to the vehicle; processing the sensor data to detect objects including object features for each detected object; responsive to a detection of an object, determining whether the object is a known object or an unknown object based on the object features and known objects indicated by the vehicle state information and an obstacle database; responsive to a determination that the object is an unknown object, updating the obstacle database with unknown object information and transmitting the unknown object information to an off-board service; receiving a response from the off-board service, the response including a weightage assigned to the unknown object; updating the obstacle database with the weightage assigned to the unknown object; and performing at least one action based on the weightage of the unknown object.

A system may include at least one memory storing instructions; and at least one processor executing the instructions to perform a process. The process may include obtaining vehicle state information for a vehicle, the vehicle state information including position, speed, heading, and/or orientation data for the vehicle; obtaining sensor data from one or more sensors onboard the vehicle; the one or more sensors scanning an environment external to the vehicle; processing the sensor data to detect objects including object features for each detected object; responsive to a detection of an object, determining whether the object is a known object or an unknown object based on the object features and known objects indicated by the vehicle state information and an obstacle database; responsive to a determination that the object is an unknown object, updating the obstacle database with unknown object information and transmitting the unknown object information to an off-board service; receiving a response from the off-board service, the response including a weightage assigned to the unknown object; updating the obstacle database with the weightage assigned to the unknown object; and performing at least one action based on the weightage of the unknown object.

A non-transitory computer-readable medium may store instructions that, when executed by a processor, cause the processor to perform a method. The method may include: obtaining vehicle state information for a vehicle, the vehicle state information including position, speed, heading, and/or orientation data for the vehicle; obtaining sensor data from one or more sensors onboard the vehicle; the one or more sensors scanning an environment external to the vehicle; processing the sensor data to detect objects including object features for each detected object; responsive to a detection of an object, determining whether the object is a known object or an unknown object based on the object features and known objects indicated by the vehicle state information and an obstacle database; responsive to a determination that the object is an unknown object, updating the obstacle database with unknown object information and transmitting the unknown object information to an off-board service; receiving a response from the off-board service, the response including a weightage assigned to the unknown object; updating the obstacle database with the weightage assigned to the unknown object; and performing at least one action based on the weightage of the unknown object.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
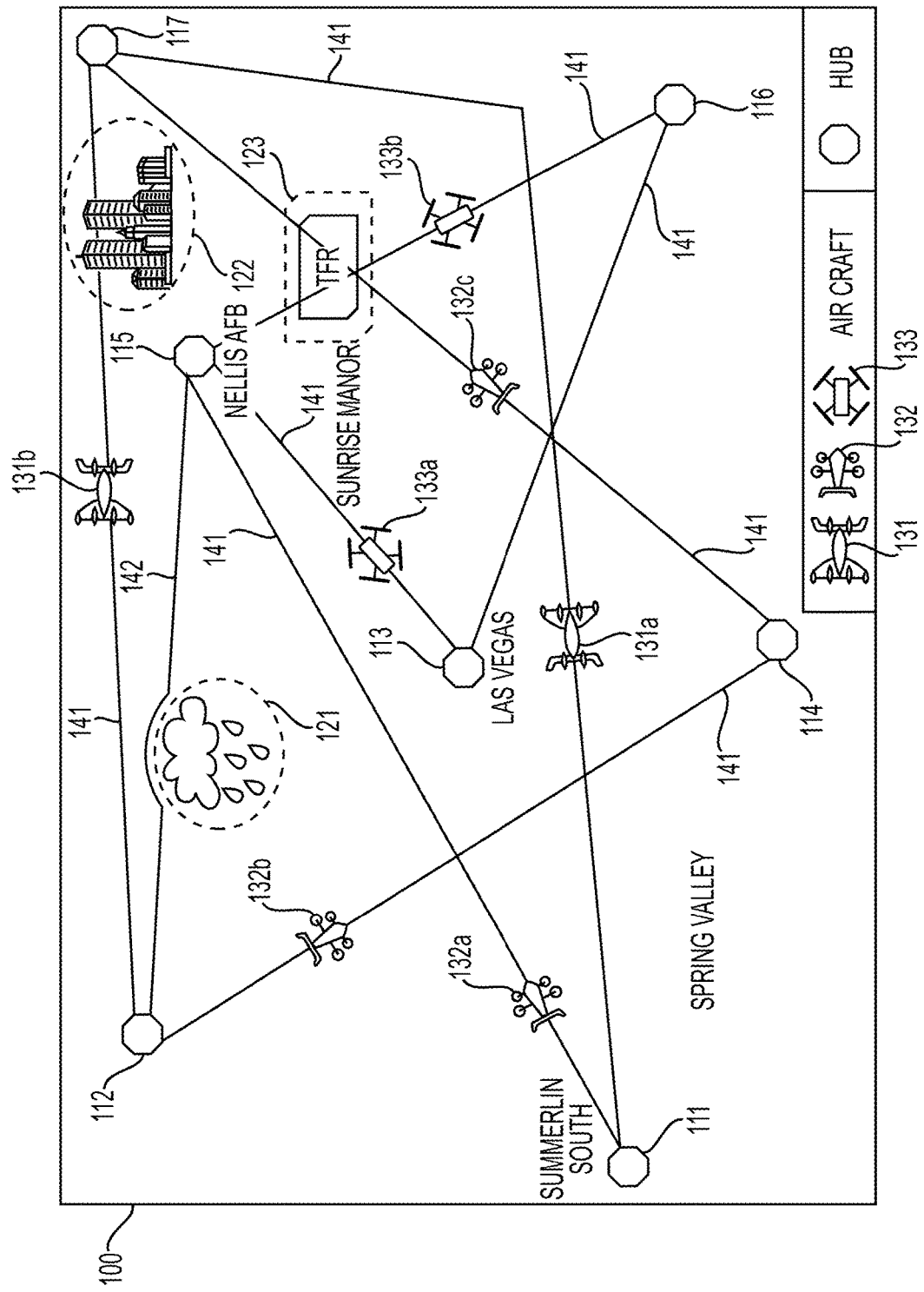
FIG. 1 depicts an example environment in which methods, systems, and other aspects of the present disclosure may be implemented.

Various embodiments of the present disclosure relate generally to obstacle detection and database management. Generally, as referred to in this disclosure, with respect to terrain awareness systems (as opposed to detect and avoid systems to avoid cooperative or non-cooperative aircraft), "objects" are environmental entities (e.g., 3D structures including buildings, structures, terra, fauna, flora, etc.) sensed outside a vehicle of reference, while "obstacles" are "objects" that have been confirmed to exist and have a corresponding set of parameters (location, shape, size, geometry, features, etc.).

In general, the present disclosure is directed to obstacle detection and database management using multi-source weightages. For instance, a vehicle (e.g., a UAV aircraft) can detect a new object (by comparing a detected object to known objects in an obstacle database) and report the new object to a cloud service. The cloud service can check for any other instances of this object being reported before (e.g., by another vehicle or by the vehicle on a previous flight) and determine a weightage using every instance of the object. The cloud service may then transmit a message to alert local vehicles of the object (e.g., update an onboard copy of the obstacle database to include the new object), so that the local vehicles may navigate safely with respect to the new object. Therefore, vehicles may reduce risk associated with the new objects that are not included in the obstacle database, by detecting the new object and sharing the information at least amongst local vehicles.

Moreover, as only the local vehicles may be alerted of the new object, communication bandwidth and onboard storage for non-local vehicles is conserved. In one aspect of the disclosure, when a weightage is high enough (e.g., the cloud service is highly confident regarding an object) the cloud service may inform the obstacle database provider, so that all vehicles may receive an update including the new object. In this manner, only when an object is confirmed (by a high weightage, such as above a threshold), are communication bandwidth and onboard storage consumed.

Additionally, the vehicles may use the weightages of obstacles and objects (determined by the cloud service) to display differentiated indicators to users and/or perform differentiated flight planning or navigation actions. Displaying differentiated indicators (e.g., a first color for confirmed obstacles, and a second color for objects) may inform users (e.g., pilots) to improve situational awareness, thereby increasing efficiency and safety. Performing differentiated flight planning or navigation based on the weightages, may enable the vehicles to plan routes/navigate routes faster with respect/closer to confirmed obstacles (as a location, size, shape, geometry is known), while the vehicles may plan routes/navigate routes slower with respect to/farther away from objects (as the exact location, size, shape, geometry is not known to a high degree of confidence). In this manner, vehicles may provide more efficient navigation (e.g., shorter distance, faster speed, and/or lower overall travel time) by using weightages of obstacles/objects.

While this disclosure describes the systems and methods with reference to aircraft, it should be appreciated that the present systems and methods are applicable to management of vehicles, including those of drones, automobiles, ships, or any other autonomous and/or Internet-connected vehicle.

As shown in FIG. 1, FIG. 1 depicts an example environment in which methods, systems, and other aspects of the present disclosure may be implemented. The environment of FIG. 1 may include an airspace 100 and one or more hubs 111-117. A hub, such as any one of 111-117, may be a ground facility where aircraft may take off, land, or remain parked (e.g., airport, vertiport, heliport, vertistop, helistop, temporary landing/takeoff facility, or the like). The airspace 100 may accommodate aircraft of various types 131-133 (collectively, "aircraft 131" unless indicated otherwise herein), flying at various altitudes and via various routes 141. An aircraft, such as any one of aircraft 131a-133b, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), a hot-air balloon, a military aircraft, etc. Any one of the aircraft 131a-133b may be connected to one another and/or to one or more of the hubs 111-117, over a communication network, using a vehicle management computer corresponding to each aircraft or each hub. Each vehicle management computer may comprise a computing device and/or a communication device, as described in more detail below in FIGS. 3A and 3B. As shown in FIG. 1, different types of aircraft that share the airspace 100 are illustrated, which are distinguished, by way of example, as model 131 (aircraft 131a and 131b), model 132 (aircraft 132a, 132b, and 132c), and model 133 (aircraft 133a and 133b).

As further shown in FIG. 1, an airspace 100 may have one or more weather constraints 121, spatial restrictions 122 (e.g., buildings), and temporary flight restrictions (TFR) 123. These are exemplary factors that a vehicle management computer of an aircraft may be required to consider and/or analyze in order to derive the most safe and optimal flight trajectory of the aircraft. For example, if a vehicle management computer of an aircraft planning to travel from hub 112 to hub 115 predicts that the aircraft may be affected by an adverse weather condition, such as weather constraint 121, in the airspace, the vehicle management computer may modify a direct path (e.g., the route 141 between hub 112 and hub 115) with a slight curvature away from the weather constraint 121 (e.g., a northward detour) to form a deviated route 142. For instance, the deviated route 142 may ensure that the path and the time of the aircraft (e.g., 4-D coordinates of the flight trajectory) do not intersect any position and time coordinates of the weather constraint 121 (e.g., 4-D coordinates of the weather constraint 121).

As another example, the vehicle management computer of aircraft 131b may predict, prior to take-off, that spatial restriction 122, caused by buildings, would hinder the direct flight path of aircraft 131b flying from hub 112 to hub 117, as depicted in FIG. 1. In response to that prediction, the vehicle management computer of aircraft 131*b* may generate a 4-D trajectory with a vehicle path that bypasses a 3-dimensional zone (e.g., zone including the location and the altitude) associated with those particular buildings. As yet another example, the vehicle management computer of aircraft 133*b* may predict, prior to take-off, that TFR 123, as well as some potential 4-D trajectories of another aircraft 132*c*, would hinder or conflict with the direct flight path of aircraft 133*b*, as depicted in FIG. 1. In response, the vehicle management computer of aircraft 133*b* may generate a 4-D trajectory with path and time coordinates that do not intersect either the 4-D coordinates of the TFR 123 or the 4-D trajectory of the other aircraft 132*c*. In this case, the TFR 123 and collision risk with another aircraft 132*c* are examples of dynamic factors which may or may not be in effect, depending on the scheduled time of travel, the effective times of TFR, and the path and schedule of the other aircraft 132*c*. As described in these examples, the 4-D trajectory derivation process, including any modification or re-negotiation, may be completed prior to take-off of the aircraft.

As another example, the vehicle management computer of aircraft 131*b* may determine to use one of the routes 141 that are set aside for aircraft 131 to use, either exclusively or non-exclusively. The aircraft 131*b* may generate a 4-D trajectory with a vehicle path that follows one of the routes 141.

As indicated above, FIG. 1 is provided merely as an example environment of an airspace that includes exemplary types of aircraft, hubs, zones, restrictions, and routes. Regarding particular details of the aircraft, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc. Any factor that renders the 4-D trajectory to be modified from the direct or the shortest path between two hubs may be considered during the derivation process.

Figure 2:
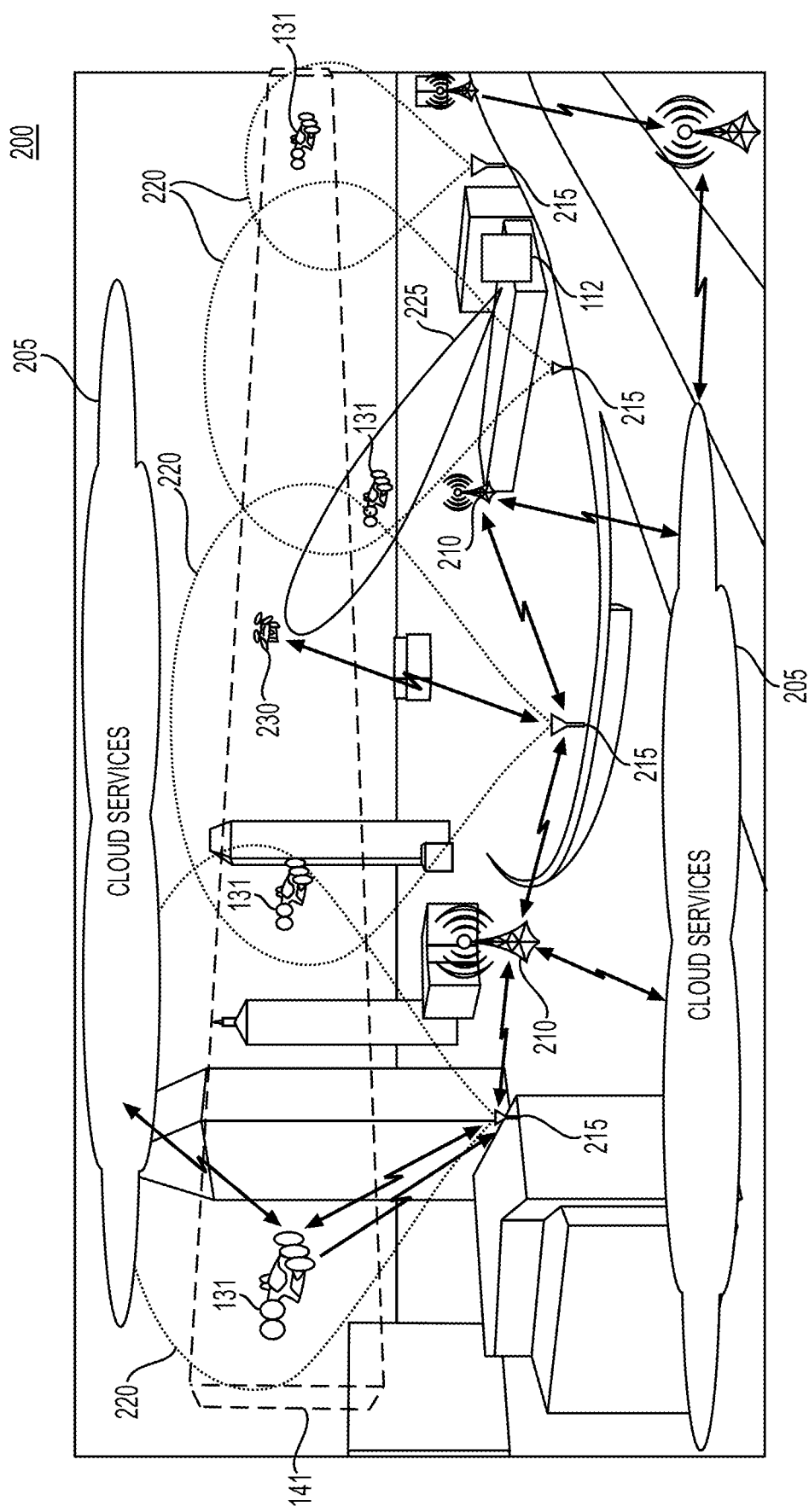
FIG. 2 depicts an exemplary a system, according to one or more embodiments.

FIG. 2 depicts an exemplary a system, according to one or more embodiments. The system 200 depicted in FIG. 2 may include one or more aircraft, such as aircraft 131, one or more intruder aircraft 230, a cloud service 205, one or more communications station(s) 210, and/or one or more ground station(s) 215. The one or more aircraft 131 may be traveling from a first hub (e.g., hub 114) to a second hub (e.g., hub 112) along a route of routes 141. Between, near, and/or on hubs, such as hubs 111-117, the one or more ground station(s) 215 may be distributed (e.g., evenly, based on traffic considerations, etc.) along/near/on/under routes 141. Between, near, and/or on hubs, such as hubs 111-117, the one or more communications station(s) 210 may be distributed (e.g., evenly, based on traffic considerations, etc.). Some (or all) of the one or more ground station(s) 215 may be paired with a communication station 210 of the one or more communications station(s) 210.

Each of the one or more ground station(s) 215 may include a transponder system, a radar system, and/or a datalink system.

The radar system of a ground station 215 may include a directional radar system. The directional radar system may be pointed upward (e.g., from ground towards sky) and the directional radar system may transmit a beam 220 to provide three-dimensional coverage over a section of a route 141. The beam 220 may be a narrow beam. The three-dimensional coverage of the beam 220 may be directly above the ground station 215 or at various skewed angles (from a vertical direction). The directional radar system may detect objects, such as aircraft 131, within the three-dimensional coverage of the beam 220. The directional radar system may detect objects by skin detection. In the case of the ground station 215 being positioned on a hub, such as the hub 112, the directional radar system may transmit a beam 225 to provide three-dimensional coverage over the hub 112. The beam 225 may be also be skewed at an angle (from a vertical direction) to detect objects arriving at, descending to, and landing on the hub 112. The beams 220/225 may be controlled either mechanically (by moving the radar system), electronically (e.g., phased arrays), or by software (e.g., digital phased array "DAPA" radars), or any combination thereof.

The transponder system of a ground station 215 may include an ADS-B and/or a Mode S transponder, and/or other transponder system (collectively, interrogator system). The interrogator system may have at least one directional antenna. The directional antenna may target a section of a route 141. For instance, targeting the section of the route 141 may reduce the likelihood of overwhelming the ecosystem (e.g., aircraft 131) with interrogations, as would be the case if the interrogator system used an omnidirectional antenna. The directional antenna may target a specific section of a route 141 by transmitting signals in a same or different beam pattern as the beam 220/225 discussed above for the radar system. The interrogator system may transmit interrogation messages to aircraft, such as aircraft 131, within the section of the route 141. The interrogation messages may include an identifier of the interrogator system and/or request the aircraft, such as aircraft 131, to transmit an identification message. The interrogator system may receive the identification message from the aircraft, such as aircraft 131. The identification message may include an identifier of the aircraft and/or transponder aircraft data (e.g., speed, position, track, etc.) of the aircraft.

If the radar system detects an object and the transponder system does not receive a corresponding identification message from the object (or does receive an identification message, but it is an invalid identification message, e.g., an identifier of un-authorized aircraft), the ground station 215 may determine that the object is an intruder aircraft 230. The ground station 215 may then transmit an intruder alert message to the cloud service 205. If the radar system detects an object and the transponder system receives a corresponding identification message from the object, the ground station 215 may determine the object is a valid aircraft. The ground station 215 may then transmit a valid aircraft message to the cloud service 205. Additionally or alternatively, the ground station 215 may transmit a detection message based on the detection of the object and whether the ground station 215 receives the identification message ("a response message"); therefore, the ground station 215 may not make a determination as to whether the detected object is an intruder aircraft or a valid aircraft, but instead send the detection message to the cloud service 205 for the cloud service 205 to determine whether the detected object is an intruder aircraft or a valid aircraft.

The datalink system of ground station 215 may communicate with at least one of the one or more communications station(s) 210. Each of the one or more communications station(s) 210 may communicate with at least one of the one or more ground station(s) 215 within a region around the communications station 210 to receive and transmit data from/to the one or more ground station(s) 215. Some or none of the communications station(s) 210 may not communicate directly with the ground station(s) 215, but may instead be relays from other communications station(s) 210 that are in direct communication with the ground station(s) 215. For instance, each of the ground station(s) 215 may communicate with a nearest one of the communications station(s) 210 (directly or indirectly). Additionally or alternatively, the ground station(s) 215 may communicate with a communications station 210 that has a best signal to the ground station 215, best bandwidth, etc. The one or more communications station(s) 210 may include a wireless communication system to communicate with the datalink system of ground station(s) 215. The wireless communication system may enable cellular communication, in accordance with, e.g., 3G/4G/5G standards. The wireless communication system may enable Wi-Fi communications, Bluetooth communications, or other short range wireless communications. Additionally or alternatively, the one or more communications station(s) 210 may communicate with the one or more of the one or more ground station(s) 215 based on wired communication, such as Ethernet, fiber optic, etc.

For instance, a ground station 215 may transmit an intruder alert message or a valid aircraft message (and/or a detection message) to a communications station 210. The communications station 210 may then relay the intruder alert message or the valid aircraft message (and/or the detection message) to the cloud service 205 (either directly or indirectly through another communications station 210).

The one or more communications station(s) 210 may also communicate with one or more aircraft, such as aircraft 131, to receive and transmit data from/to the one or more aircraft. For instance, one or more communications station(s) 210 may relay data between the cloud service 205 and a vehicle, such as aircraft 131.

The cloud service 205 may communicate with the one or more communications station(s) 210 and/or directly (e.g., via satellite communications) with aircraft, such as aircraft 131. The cloud service 205 may provide instructions, data, and/or warnings to the aircraft 131. The cloud service 205 may receive acknowledgements from the aircraft 131, aircraft data from the aircraft 131, and/or other information from the aircraft 131. For instance, the cloud service 205 may provide, to the aircraft 131, weather data, traffic data, landing zone data for the hubs, such as hubs 111-117, updated obstacle data, flight plan data, etc. The cloud service 205 may also provide software as a service (SaaS) to aircraft 131 to perform various software functions, such as navigation services, Flight Management System (FMS) services, etc., in accordance with service contracts, API requests from aircraft 131, etc.

Figure 3A:
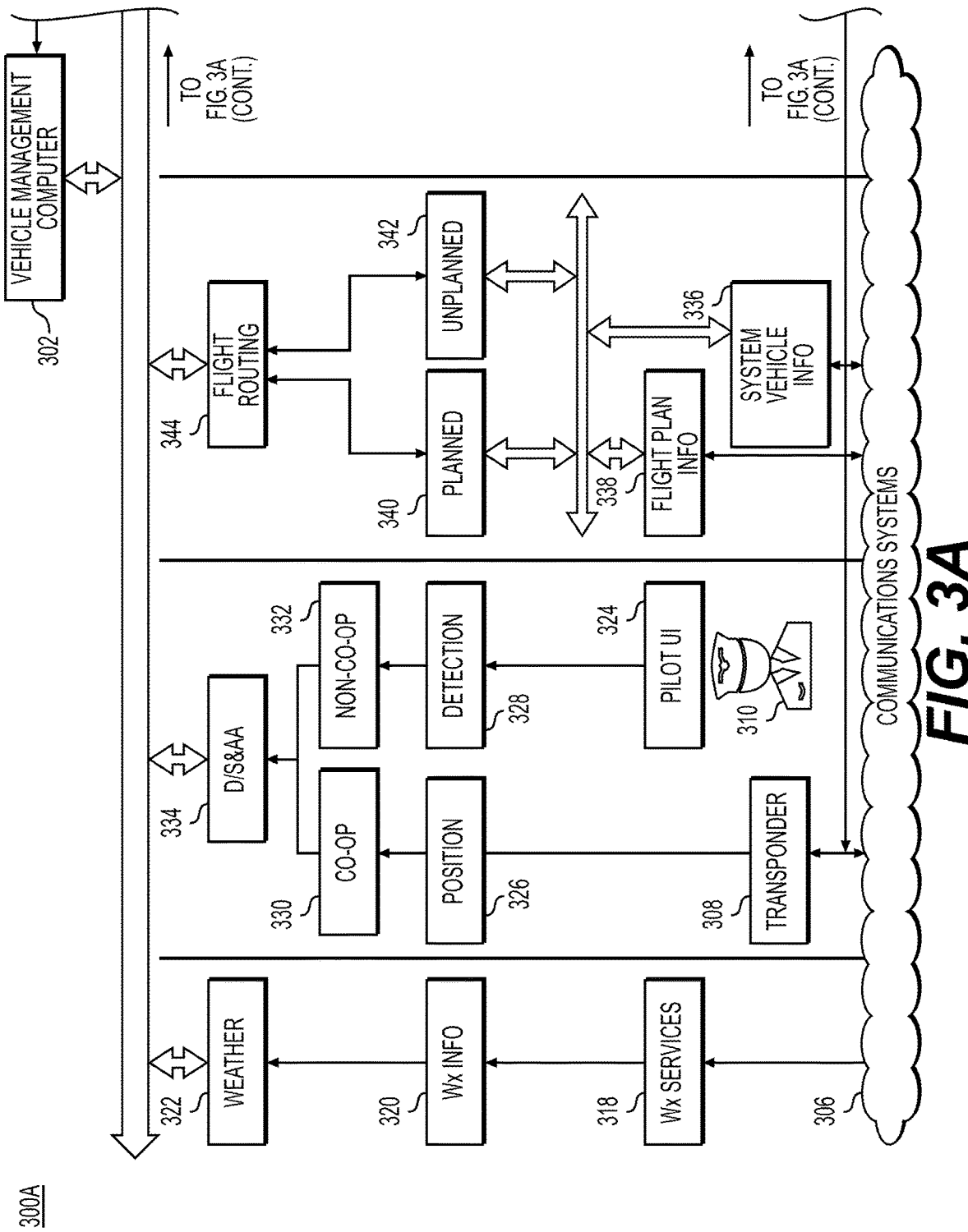
FIGS. 3A and 3B depict exemplary block diagrams of a vehicle of a system, according to one or more embodiments.
Figure 3A:
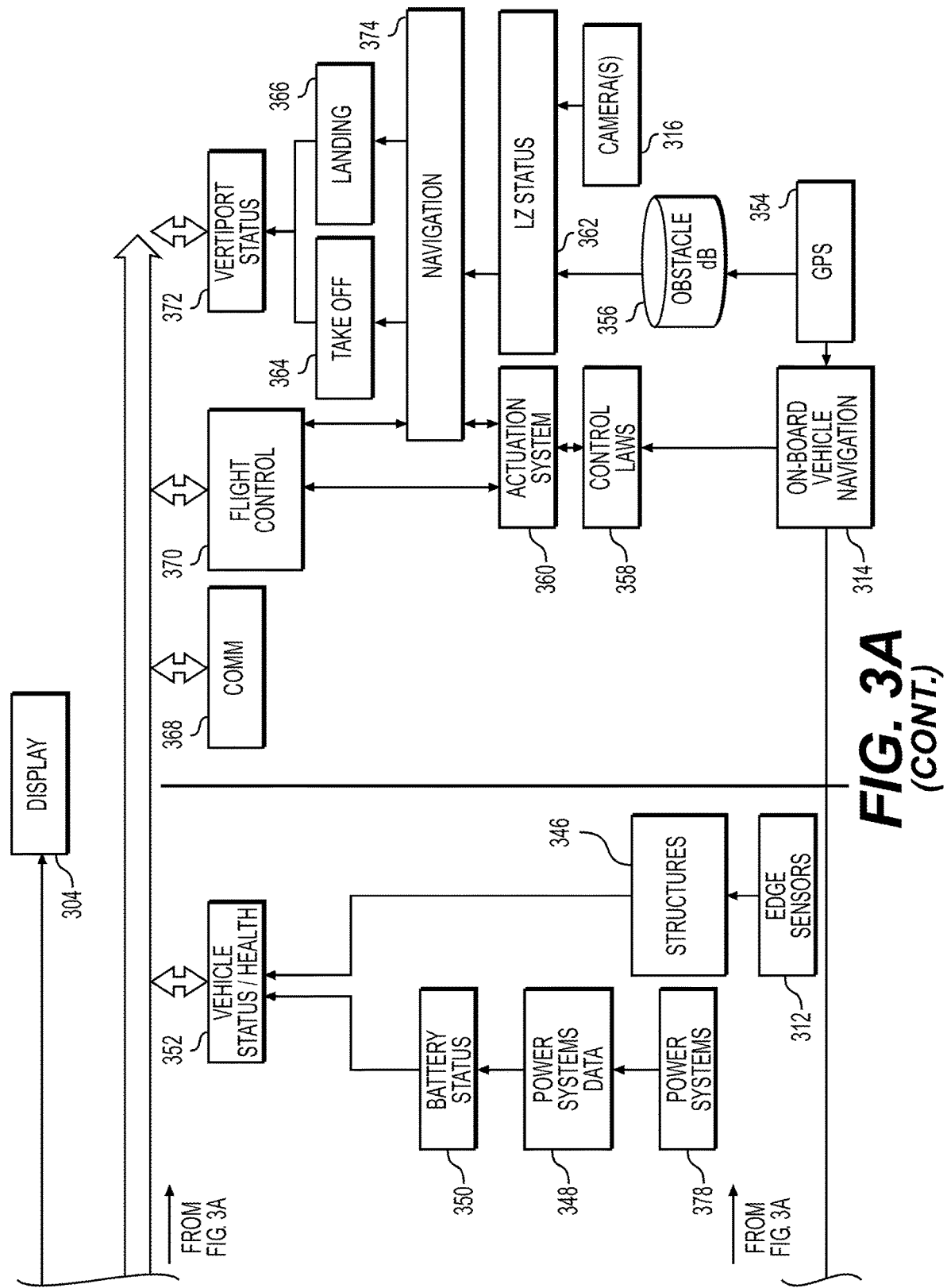
Figure 3B:
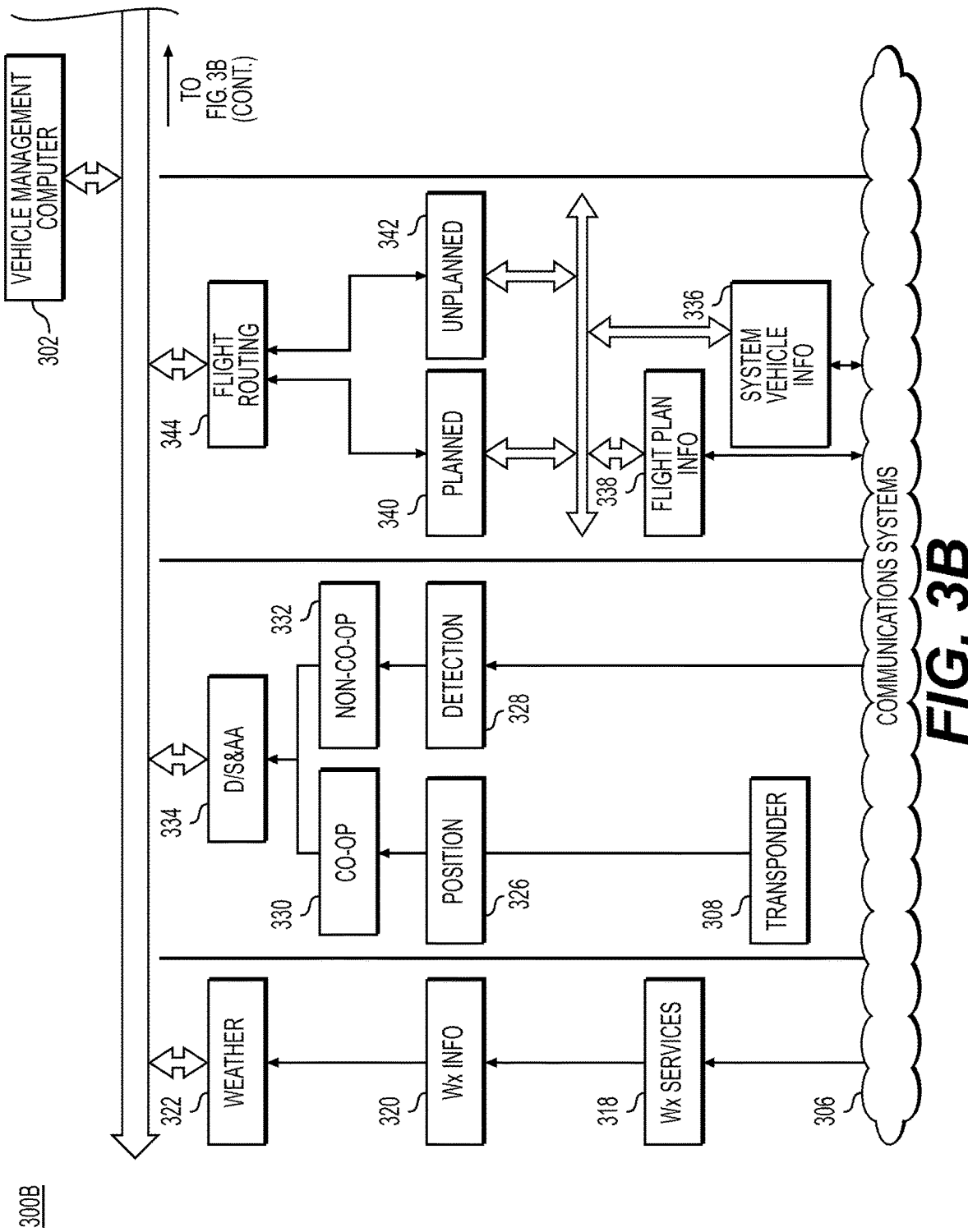
Figure 3B:
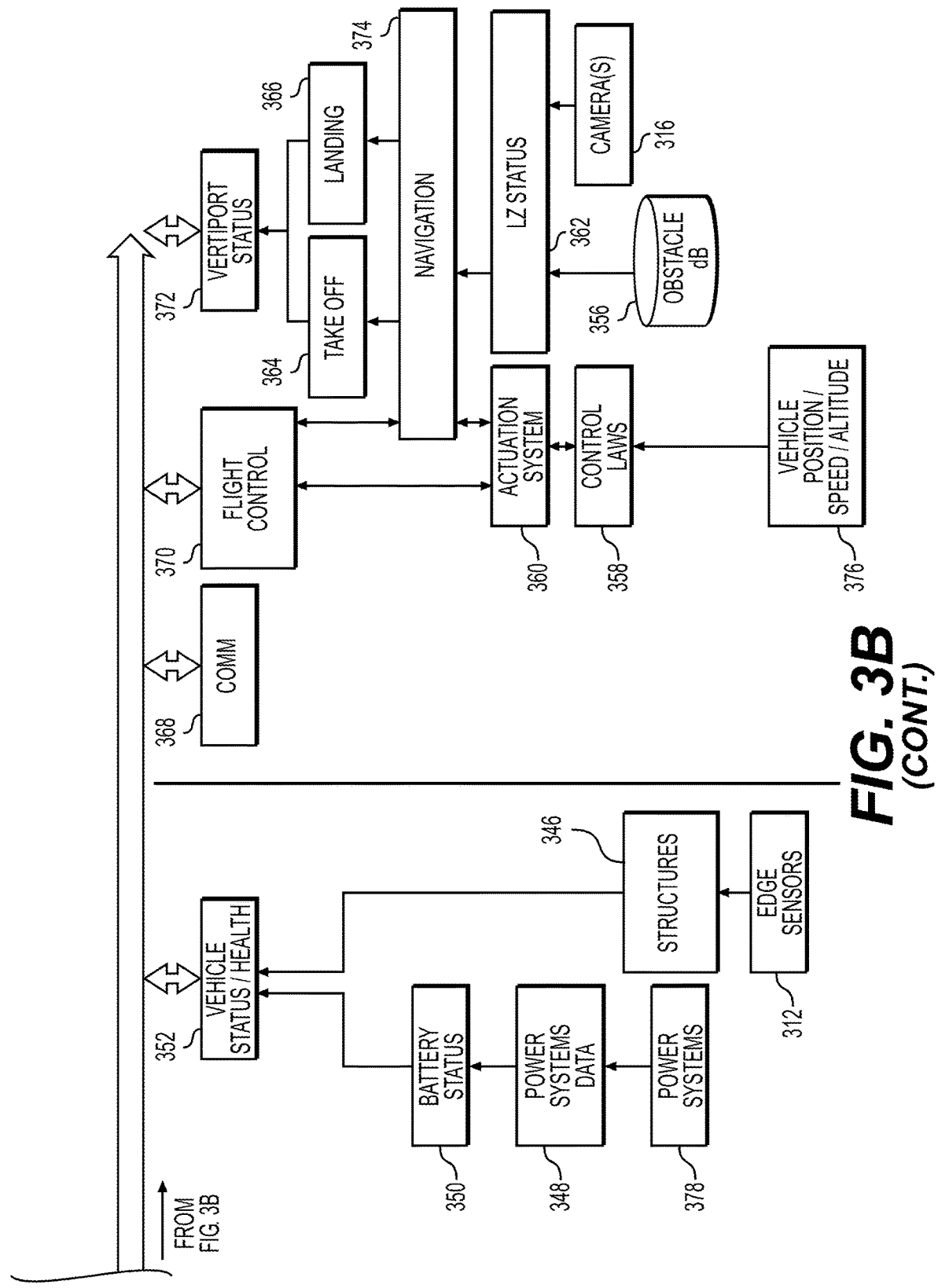

FIGS. 3A and 3B depict exemplary block diagrams of a vehicle of a system, according to one or more embodiments. FIG. 3A may depict a block diagram 300A and FIG. 3B may depict a block diagram 300B, respectively, of a vehicle, such as aircraft 131-133. Generally, the block diagram 300A may depict systems, information/data, and communications between the systems of a piloted or semi-autonomous vehicle, while the block diagram 300B may depict systems, information/data, and communications between the systems of a fully autonomous vehicle. The aircraft 131 may be one of the piloted or semi-autonomous vehicle and/or the fully autonomous vehicle.

The block diagram 300A of an aircraft 131 may include a vehicle management computer 302 and electrical, mechanical, and/or software systems (collectively, "vehicle systems"). The vehicle systems may include: one or more display(s) 304; communications systems 306; one or more transponder(s) 308; pilot/user interface(s) 324 to receive and communicate information from pilots and/or users 310 of the aircraft 131; edge sensors 312 on structures 346 of the aircraft 131 (such as doors, seats, tires, etc.); power systems 378 to provide power to actuation systems 360; camera(s) 316; GPS systems 354; on-board vehicle navigation systems 314; flight control computer 370; and/or one or more data storage systems. The vehicle management computer 302 and the vehicle systems may be connected by one or a combination of wired or wireless communication interfaces, such as TCP/IP communication over Wi-Fi or Ethernet (with or without switches), RS-422, ARINC-429, or other communication standards (with or without protocol switches, as needed).

The vehicle management computer 302 may include at least a network interface, a processor, and a memory, each coupled to each other via a bus or indirectly via wired or wireless connections (e.g., Wi-Fi, Ethernet, parallel or serial ATA, etc.). The memory may store, and the processor may execute, a vehicle management program. The vehicle management program may include a weather program 322, a Detect/See & Assisted Avoidance (D/S & A) program 334, a flight routing program 344, a vehicle status/health program 352, a communications program 368, a flight control program 370, and/or a vertiport status program 372 (collectively, "sub-programs"). The vehicle management program may obtain inputs from the sub-programs and send outputs to the sub-programs to manage the aircraft 131, in accordance with program code of the vehicle management program. The vehicle management program may also obtain inputs from the vehicle systems and output instructions/data to the vehicle systems, in accordance with the program code of the vehicle management program.

The vehicle management computer 302 may transmit instructions/data/graphical user interface(s) to the one or more display(s) 304 and/or the pilot/user interface(s) 324. The one or more display(s) 304 and/or the pilot/user interface(s) 324 may receive user inputs, and transmit the user inputs to the vehicle management computer 302.

The communications systems 306 may include various data links systems (e.g., satellite communications systems), cellular communications systems (e.g., LTE, 4G, 5G, etc.), radio communications systems (e.g., HF, VHF, etc.), and/or wireless local area network communications systems (e.g., Wi-Fi, Bluetooth, etc.). The communications systems 306 may enable communications, in accordance with the communications program 368, between the aircraft 131 and external networks, services, and the cloud service 205, discussed above. An example of the external networks may include a wide area network, such as the internet. Examples of the services may include weather information services 318, traffic information services, etc.

The one or more transponder(s) 308 may include an interrogator system. The interrogator system of the aircraft 131 may be an ADS-B, a Mode S transponder, and/or other transponder system. The interrogator system may have an omnidirectional antenna and/or a directional antenna (interrogator system antenna). The interrogator system antenna may transmit/receive signals to transmit/receive interrogation messages and transmit/receive identification messages. For instance, in response to receiving an interrogation message, the interrogator system may obtain an identifier of the aircraft 131 and/or transponder aircraft data (e.g., speed, position, track, etc.) of the aircraft 131, e.g., from the on-board vehicle navigation systems 314; and transmit an identification message. Contra-wise, the interrogator system may transmit interrogation messages to nearby aircraft; and receive identification messages. The one or more transponder(s) 308 may send messages to the vehicle management computer 302 to report interrogation messages and/or identification messages received from/transmitted to other aircraft and/or the ground station(s) 215. As discussed above, the interrogation messages may include an identifier of the interrogator system (in this case, the aircraft 131), request the nearby aircraft to transmit an identification message, and/or (different than above) transponder aircraft data (e.g., speed, position, track, etc.) of the aircraft 131; the identification message may include an identifier of the aircraft 131 and/or the transponder aircraft data of the aircraft 131.

The edge sensors 312 on the structures 346 of the aircraft 131 may be sensors to detect various environmental and/or system status information. For instance, some of the edge sensors 312 may monitor for discrete signals, such as edge sensors on seats (e.g., occupied or not), doors (e.g., closed or not), etc. of the aircraft 131. Some of the edge sensors 312 may monitor continuous signals, such as edge sensors on tires (e.g., tire pressure), brakes (e.g., engaged or not, amount of wear, etc.), passenger compartment (e.g., compartment air pressure, air composition, temperature, etc.), support structure (e.g., deformation, strain, etc.), etc., of the aircraft 131. The edge sensors 312 may transmit edge sensor data to the vehicle management computer 302 to report the discrete and/or continuous signals.

The power systems 378 may include one or more battery systems, fuel cell systems, and/or other chemical power systems to power the actuation systems 360 and/or the vehicle systems in general. In one aspect of the disclosure, the power systems 378 may be a battery pack. The power systems 378 may have various sensors to detect one or more of temperature, fuel/electrical charge remaining, discharge rate, etc. (collectively, power system data 348). The power systems 378 may transmit power system data 348 to the vehicle management computer 302 so that power system status 350 (or battery pack status) may be monitored by the vehicle status/health program 352.

The actuation systems 360 may include: motors, engines, and/or propellers to generate thrust, lift, and/or directional force for the aircraft 131; flaps or other surface controls to augment the thrust, lift, and/or directional force for the aircraft 131; and/or aircraft mechanical systems (e.g., to deploy landing gear, windshield wiper blades, signal lights, etc.). The vehicle management computer 302 may control the actuation systems 360 by transmitting instructions, in accordance with the flight control program 370, and the actuation systems 360 may transmit feedback/current status of the actuation systems 360 to the vehicle management computer 302 (which may be referred to as actuation systems data).

The camera(s) 316 may include inferred or optical cameras, LIDAR, or other visual imaging systems to record internal or external environments of the aircraft 131. The camera(s) 316 may obtain inferred images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 316 and/or the vehicle management computer 302 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed (a landing zone (LZ) status 362). Additionally or alternatively, the machine vision function may determine whether physical environment (e.g., buildings, structures, cranes, etc.) around the aircraft 131 and/or on/near the routes 141 may be or will be (e.g., based on location, speed, flight plan of the aircraft 131) within a safe flight envelope of the aircraft 131. The imaging data and/or the machine vision outputs may be referred to as "imaging output data." The camera(s) 316 may transmit the imaging data and/or the machine vision outputs of the machine vision function to the vehicle management computer 302. The camera(s) 316 may determine whether elements detected in the physical environment are known or unknown based on obstacle data stored in an obstacle database 356, such as by determining a location of the detected object and determining if an obstacle in the obstacle database has the same location (or within a defined range of distance). The imaging output data may include any obstacles determined to not be in the obstacle data of the obstacle database 356 (unknown obstacles information).

The GPS systems 354 may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. The GNSS receivers may determine positioning information for the aircraft 131. The positioning information may include information about one or more of position (e.g., latitude and longitude, or Cartesian coordinates), altitude, speed, heading, or track, etc. for the vehicle. The GPS systems 354 may transmit the positioning information to the on-board vehicle navigation systems 314 and/or to the vehicle management computer 302.

The on-board vehicle navigation systems 314 may include one or more radar(s), one or more magnetometer(s), an attitude heading reference system (AHRS), and/or one or more air data module(s). The one or more radar(s) may be weather radar(s) to scan for weather and/or DAPA radar(s) (either omnidirectional and/or directional) to scan for terrain/ground/objects/obstacles. The one or more radar(s) (collectively "radar systems") may obtain radar information. The radar information may include information about the local weather and the terrain/ground/objects/obstacles (e.g., aircraft or obstacles and associated locations/movement). The one or more magnetometer(s) may measure magnetism to obtain bearing information for the aircraft 131. The AHRS may include sensors (e.g., three sensors on three axes) to obtain attitude information for the aircraft 131. The attitude information may include roll, pitch, and yaw of the aircraft 131. The air data module(s) may sense external air pressure to obtain airspeed information for the aircraft 131. The radar information, the bearing information, the attitude information, airspeed information, and/or the positioning information (collectively, navigation information) may be transmitted to the vehicle management computer 302.

The weather program 322 may, using the communications systems 306, transmit and/or receive weather information from one or more of the weather information services 318. For instance, the weather program 322 may obtain local weather information from weather radars and the on-board vehicle navigation systems 314, such as the air data module(s). The weather program may also transmit requests for weather information 320. For instance, the request may be for weather information 320 along a route 141 of the aircraft 131 (route weather information). The route weather information may include information about precipitation, wind, turbulence, storms, cloud coverage, visibility, etc. of the external environment of the aircraft 131 along/near a flight path, at a destination and/or departure location (e.g., one of the hubs 111-117), or for a general area around the flight path, destination location, and/or departure location. The one or more of the weather information services 318 may transmit responses that include the route weather information. Additionally or alternatively, the one or more of the weather information services 318 may transmit update messages to the aircraft 131 that includes the route weather information and/or updates to the route weather information.

The D/S & A program 334 may, using the one or more transponders 308 and/or the pilot/user interface(s) 324, detect and avoid objects that may pose a potential threat to the aircraft 131. As an example, the pilot/user interface(s) 324 may receive user input(s) from the pilots and/or users of the vehicle 310 (or radar/imaging detection) to indicate a detection of an object; the pilot/user interface(s) 324 (or radar/imaging detection) may transmit the user input(s) (or radar or imaging information) to the vehicle management computer 302; the vehicle management computer 302 may invoke the D/S & A program 334 to perform an object detection process 328 to determine whether the detected object is a non-cooperative object 332 (e.g., it is an aircraft that is not participating in transponder communication); optionally, the vehicle management computer 302 may determine a position, speed, track for the non-cooperative object 332 (non-cooperative object information), such as by radar tracking or image tracking; in response to determining the object is a non-cooperative object 332, the vehicle management computer 302 may determine a course of action, such as instruct the flight control program 370 to avoid the non-cooperative object 332. As another example, the one or more transponder(s) 308 may detect an intruder aircraft (such as intruder aircraft 230) based on an identification message from the intruder aircraft; the one or more transponder(s) 308 may transmit a message to the vehicle management computer 302 that includes the identification message from the intruder aircraft; the vehicle management computer 302 may extract an identifier and/or transponder aircraft data from the identification message to obtain the identifier and/or speed, position, track, etc. of the intruder aircraft; the vehicle management computer 302 may invoke the D/S & A program 334 to perform a position detection process 326 to determine whether the detected object is a cooperative object 330 and its location, speed, heading, track, etc.; in response to determining the object is a cooperative object 330, the vehicle management computer 302 may determine a course of action, such as instruct the flight control program 370 to avoid the cooperative object 330. For instance, the course of action may be different or the same for non-cooperative and cooperative objects 330/332, in accordance with rules based on regulations and/or scenarios.

The flight routing program 344 may, using the communications systems 306, generate/receive flight plan information 338 and receive system vehicle information 336 from the cloud service 205. The flight plan information 338 may include a departure location (e.g., one of the hubs 111-117), a destination location (e.g., one of the hubs 111-117), intermediate locations (if any) (e.g., waypoints or one or more of the hubs 111-117) between the departure and destination locations, and/or one or more routes 141 to be used (or not used). The system vehicle information 336 may include other aircraft positioning information for other aircraft with respect to the aircraft 131 (called a "receiving aircraft 131" for reference). For instance, the other aircraft positioning information may include positioning information of the other aircraft. The other aircraft may include: all aircraft 131-133 and/or intruder aircraft 230; aircraft 131-133 and/or intruder aircraft 230 within a threshold distance of the receiving aircraft 131; aircraft 131-133 and/or intruder aircraft 230 using a same route 141 (or is going to use the same route 141 or crossing over the same route 141) of the receiving aircraft; and/or aircraft 131-133 and/or intruder aircraft 230 within a same geographic area (e.g., city, town, metropolitan area, or sub-division thereof) of the receiving aircraft.

The flight routing program 344 may determine or receive a planned flight path 340. The flight routing program 344 may receive the planned flight path 340 from another aircraft 131 or the cloud service 205 (or other service, such as an operating service of the aircraft 131). The flight routing program 344 may determine the planned flight path 340 using various planning algorithms (e.g., flight planning services on-board or off-board the aircraft 131), aircraft constraints (e.g., cruising speed, maximum speed, maximum/minimum altitude, maximum range, etc.) of the aircraft 131, and/or external constraints (e.g., restricted airspace, noise abatement zones, etc.). The planned/received flight path may include a 4-D trajectory of a flight trajectory with 4-D coordinates, a flight path based on waypoints, any suitable flight path for the aircraft 131, or any combination thereof, in accordance with the flight plan information 338 and/or the system vehicle information 336. The 4-D coordinates may include 3-D coordinates of space (e.g., latitude, longitude, and altitude) for a flight path and time coordinate.

The flight routing program 344 may determine an unplanned flight path 342 based on the planned flight path 340 and unplanned event triggers, and using the various planning algorithms, the aircraft constraints of the aircraft 131, and/or the external constraints. The vehicle management compute 302 may determine the unplanned event triggers based on data/information the vehicle management compute 302 receives from other vehicle systems or from the cloud service 205. The unplanned event triggers may include one or a combination of: (1) emergency landing, as indicated by the vehicle status/health program 352 discussed below or by a user input to one or more display(s) 304 and/or the pilot/user interface(s) 324; (2) intruder aircraft 230, cooperative object 330, or non-cooperative object 332 encroaching on a safe flight envelope of the aircraft 131; (3) weather changes indicated by the route weather information (or updates thereto); (4) the machine vision outputs indicating a portion of the physical environment may be or will be within the safe flight envelope of the aircraft 131; and/or (5) the machine vision outputs indicating a landing zone is obstructed.

Collectively, the unplanned flight path 342/the planned flight path 340 and other aircraft positioning information may be called flight plan data.

The vehicle status/health program 352 may monitor vehicle systems for status/health, and perform actions based on the monitored status/health, such as periodically report status/health, indicate emergency status, etc. The vehicle may obtain the edge sensor data and the power system data 348. The vehicle status/health program 352 may process the edge sensor data and the power system data 348 to determine statuses of the power system 378 and the various structures and systems monitored by the edge sensors 312, and/or track a health of the power system 378 and structures and systems monitored by the edge sensors 312. For instance, the vehicle status/health program 352 may obtain the power systems data 348; determine a battery status 350; and perform actions based thereon, such as reduce consumption of non-essential systems, report battery status, etc. The vehicle status/health program 352 may determine an emergency landing condition based on one or more of the power system 378 and structures and systems monitored by the edge sensors 312 has a state that indicates the power system 378 and structures and systems monitored by the edge sensors 312 has or will fail soon. Moreover, the vehicle status/health program 352 may transmit status/health data to the cloud service 205 as status/health messages (or as a part of other messages to the cloud service). The status/health data may include the actuation systems data, all of the edge sensor data and/or the power system data, portions thereof, summaries of the edge sensor data and the power system data, and/or system status indicators (e.g., operating normal, degraded wear, inoperable, etc.) based on the edge sensor data and the power system data.

The flight control program 370 may control the actuation system 360 in accordance with the unplanned flight path 342/the planned flight path 340, the other aircraft positioning information, control laws 358, navigation rules 374, and/or user inputs (e.g., of a pilot if aircraft 131 is a piloted or semi-autonomous vehicle). The flight control program 370 may receive the planned flight path 340/unplanned flight path 342 and/or the user inputs (collectively, "course"), and determine inputs to the actuation system 360 to change speed, heading, attitude of the aircraft 131 to match the course based on the control laws 358 and navigation rules 374. The control laws 358 may dictate a range of actions possible of the actuation system 360 and map inputs to the range of actions to effectuate the course by, e.g., physics of flight of the aircraft 131. The navigation rules 374 may indicate acceptable actions based on location, waypoint, portion of flight path, context, etc. (collectively, "circumstance"). For instance, the navigation rules 374 may indicate a minimum/maximum altitude, minimum/maximum speed, minimum separation distance, a heading or range of acceptable headings, etc. for a given circumstance.

The vertiport status program 372 may control the aircraft 131 during takeoff (by executing a takeoff process 364) and during landing (by executing a landing process 366). The takeoff process 364 may determine whether the landing zone from which the aircraft 131 is to leave and the flight environment during the ascent is clear (e.g., based on the control laws 358, the navigation rules 374, the imaging data, the obstacle data, the unplanned flight path 342/the planned flight path 340, the other aircraft positioning information, user inputs, etc.), and control the aircraft or guide the pilot through the ascent (e.g., based on the control laws 358, the navigation rules 374, the imaging data, the obstacle data, the flight plan data, user inputs, etc.). The landing process 366 may determine whether the landing zone on which the aircraft 131 is to land and the flight environment during the descent is clear (e.g., based on the control laws 358, the navigation rules 374, the imaging data, the obstacle data, the flight plan data, user inputs, the landing zone status, etc.), and control the aircraft or guide the pilot through the descent (e.g., based on the control laws 358, the navigation rules 374, the imaging data, the obstacle data, the flight plan data, user inputs, the landing zone status, etc.).

The one or more data storage systems may store data/information received, generated, or obtained onboard the aircraft. The one or more data storage systems may also store software for one or more of the computers onboard the aircraft.

The block diagram 300B may be the same as the block diagram 300A, but the block diagram 300B may omit the pilot/user interface(s) 324 and/or the one or more displays 304, and include a vehicle position/speed/altitude system 376. The vehicle position/speed/altitude system 376 may include or not include the on-board vehicle navigation systems 314 and/or the GPS systems 354, discussed above. In the case that the vehicle position/speed/altitude system 376 does not include the on-board vehicle navigation systems 314 and/or the GPS systems 354, the vehicle position/speed/altitude system 376 may obtain the navigation information from the cloud service 205.

In one aspect of the disclosure, the aircraft 131 may detect objects, report new objects to the cloud service 205, and update the obstacle database 356 based on feedback from the cloud service 205.

Figure 4:
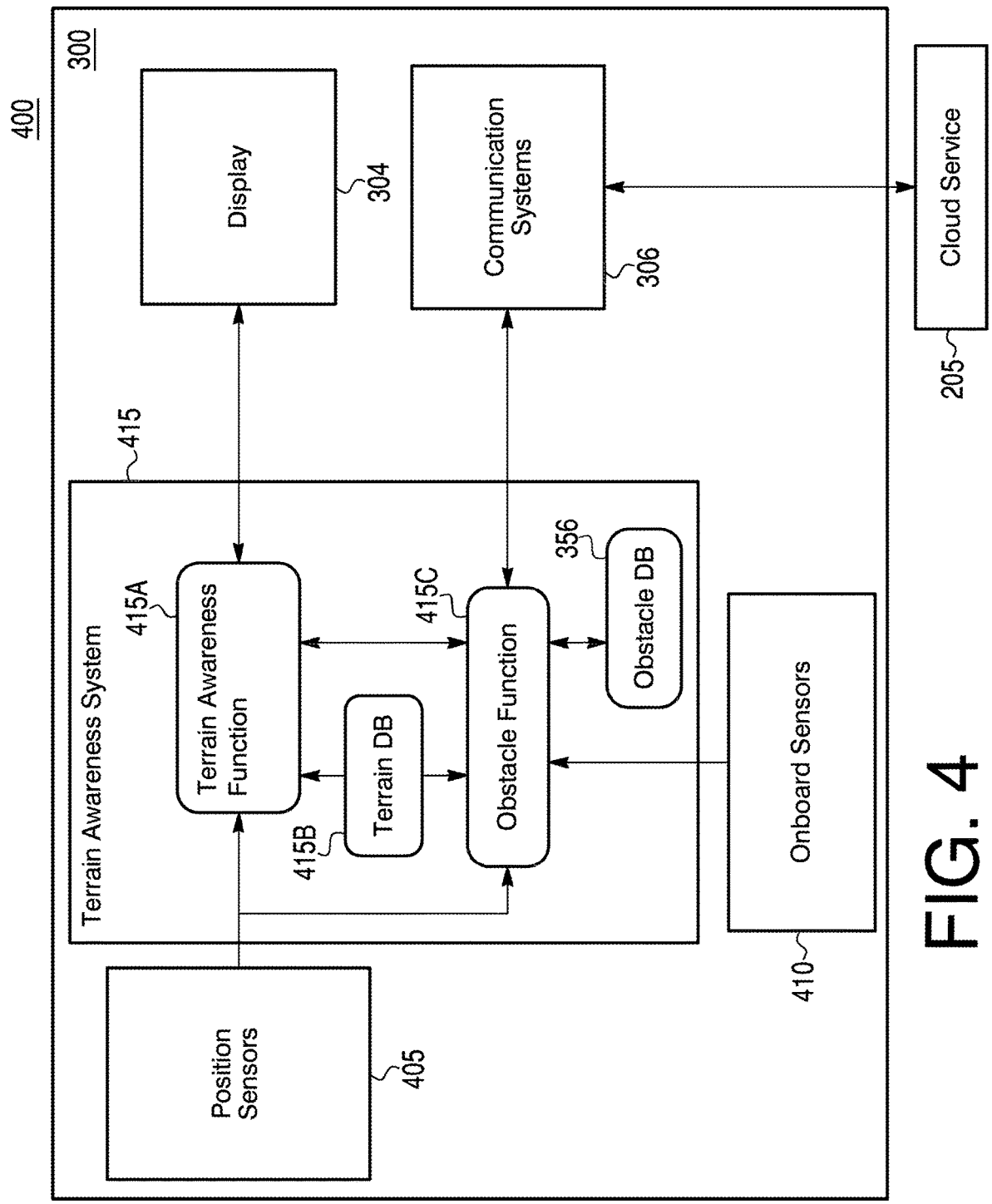
FIG. 4 depicts an exemplary block diagram of a system for obstacle detection and database management using multi-source weightages, according to one or more embodiments.

In particular, turning to FIG. 4, FIG. 4 depicts an exemplary block diagram of a system 400 for obstacle detection and database management using multi-source weightages, according to one or more embodiments. The system 400 depicts particular elements of FIGS. 1-3B with additional elements to illustrate obstacle detection and database management using multi-source weightages. The system 400 may include position sensors 405, onboard sensors 410, a terrain awareness (TA) system 415, the display 304, and the communications system 306 onboard a vehicle 300 (such as one of 300A or 300B depicting the aircraft 131), and the cloud services 205. The system 400 may detect objects, determine whether the detected objects are new objects (e.g., by comparing with known objects in the obstacle DB), and distribute new object information to vehicles, such as vehicle 300, so that onboard obstacle databases may be updated accordingly.

For instance, the vehicle 300 may detect new objects and report them to the cloud service 205. The cloud service 205 may determine whether the object has been reported by any other sources (e.g., other vehicles 300) and determine a weightage to assign the new object based on every reported instance of the object. The weightage may indicate a confidence of object location, size, shape, and/or features. The cloud service 205 may then broadcast information about the new object to all vehicles or only vehicles within a threshold range from a location of the object (including the vehicle 300 that reported the new object), and/or report a new object to a database provider (which may be the same entity as the cloud service 205). In response to receiving the broadcast information regarding the object, the vehicle 300 may, based on the weightage, output an alert, display an indicator corresponding to the new object, update flight plans of the vehicle, and/or update navigation computations.

The position sensors 405 may include the GPS systems 354 and on-board vehicle navigation systems 314 (in the case of vehicle 300A) or (in the case of vehicle 300B) the vehicle position/speed/altitude system 376. Generally, the position sensors 405 output vehicle state information on a continuous or periodic basis so that the vehicle 300 is aware of its current state. The vehicle state information may include position, speed, heading, and/or orientation data for the vehicle 300.

The onboard sensors 410 may include the camera(s) 316 to output the imaging output data (e.g., the imaging data and/or the machine vision outputs), and the one or more display(s) 304 and/or the pilot/user interface(s) 324 to receive user inputs (referred to collectively as "sensor data").

The user inputs may indicate an approximate location and geometry for a new object (e.g., an object not already indicated on a display as a known object). For instance, the user input may be an input on a digital map, and a position of the user input on the digital map may indicate the position of the new object in an external environment. Additionally or alternatively, the user input may enter absolute or relative coordinates from the vehicle 300 (e.g., an estimate of latitude and longitude, or an estimate of a distance/range and heading from the vehicle, etc.). The user inputs may indicate the object features by indicating one or more of: shape (2D or 3D shapes), size, obstacle outline, dominant edges, and/or dimensions (e.g., height, length, width, or geometry).

The TA system 415 may include a TA function 415A, a terrain database 415B, an obstacle function 415C, and (a copy of or access to) the obstacle database 356. The TA function 415A of the TA system 415 may use the terrain database 415B and the obstacle function 415C (based on data received from the position sensors and the onboard sensors 410) to detect and avoid, automatically or via alerting a pilot/user via the display 304, terrain and obstacles.

Figure 5:
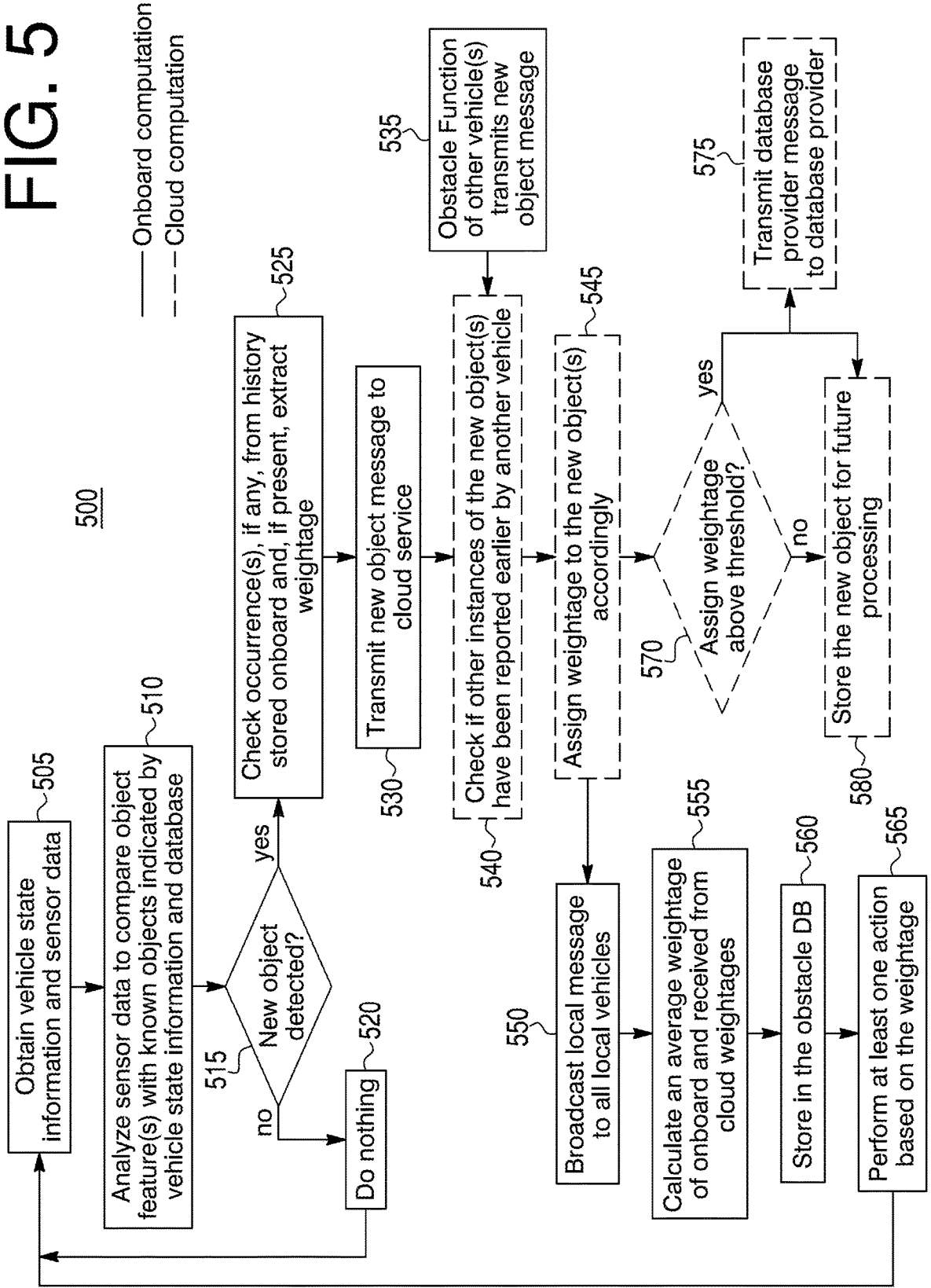
FIG. 5 depicts a flowchart for obstacle detection and database management using multi-source weightages, according to one or more embodiments.

In particular, turning to FIG. 5, FIG. 5 depicts a flowchart 500 for obstacle detection and database management using multi-source weightages, according to one or more embodiments. In particular, the flowchart 500 of FIG. 5 is performed by the obstacle function 415C and the cloud service 205 of the system 400. The flowchart 500 starts with the obstacle function 415C obtaining the vehicle state information and the sensor data (Block 505). The obstacle function 415C may then proceed to analyze the sensor data to compare object feature(s) of detected objects with known objects indicated by vehicle state information and obstacle database (Block 510). For instance, the obstacle function 415C may process the sensor data to detect objects including object features for each detected object; and responsive to a detection of an object, determine whether the object is a known object or an unknown object based on the object features and known objects indicated by the vehicle state information and an obstacle database.

To process the sensor data to detect objects including object features for each detected object, the obstacle function 415C may, for images, detect objects using the machine vision function (e.g., using machine learning, etc.) and, for detected objects, extract object features from the imaging data. For images, the object features may include image features such as obstacle outline, position, dominant edges, and/or dimensions (e.g., height, length, width, or geometry). The image features may be stored in pixel form using digital processing techniques. For user inputs, the obstacle function 415C may detect the object in response to the user input and determine the object features entered by the user input.

To determine whether the object is a known object or an unknown object based on the object features and known objects indicated by the vehicle state information and an obstacle database, the obstacle function 415C may: determine known objects by extracting known objects from the obstacle database; compare the detected objects with the known objects; if the comparison indicates a match, determine the detected object is a known object; and if the comparison indicates not a match, determine the detected object is an unknown object.

To extract known objects from the obstacle database, the obstacle function 415C may extract known objects that are within a threshold distance of the vehicle 300 and/or extract known objects that are within an envelope of the onboard sensors 410. The envelope of the onboard sensors 410 may be defined based on the type of camera(s) 316 that output the imaging data (e.g., a max sensing distance for each type).

For instance, the obstacle function 415C may determine a position of the vehicle 300 from the vehicle state information (e.g., extract position or derive position from speed, heading, etc.) and extract known objects that are within the threshold distance of the position/within the envelope of the onboard sensors 410.

To compare the detected objects with the known objects, the obstacle function 415C may compare the object features of the detected object (as input by the user or determined by the obstacle function 415C) to object features of the extracted known objects. For instance, for object features determined by the obstacle function 415C, the obstacle function 415C may compare the image features of the detected object to image slices of the known objects to determine whether there is a match. To determine whether there is a match, the obstacle function 415C may determine a match when all, a majority, or a threshold number of obstacle outline, position, dominant edges, and/or dimensions of the image features are sufficiently close (e.g., the same as or within a range of) to an obstacle outline, position, dominant edges, and/or dimensions of an image slice of a known object. Similarly, for object features input by user input, the obstacle function 415C may compare image features generated based on the user input object features to the image slices of the known objects to determine whether there is a match. Alternatively, the obstacle function 415C may compare the image features of the detected object to image slices of the known objects to determine whether there is a match by: (1) generating a feature vector based on the detected object (e.g., the imaging data associated with the detected objects, the object features for the detected objects, and/or the image features for the detected objects) and the image slices of the known objects; (2) process the feature vector through a matching machine learning program (e.g., a neural network) to output a score for each known object; and (3) if a score is above a threshold (e.g., a confidence threshold), determine the detected object matches a known object that corresponds to the score about the threshold.

The obstacle function 415C may then proceed to determine whether a new object is detected (Block 515). In response to determining a new object is not detected (Block 515: No), the obstacle function 415C may proceed to do nothing (block 520), then return to obtain vehicle state information and sensor data (Block 505) to start the process over again with new data.

In response to determining a new object is detected (Block 515: Yes), the obstacle function 415C may proceed to check occurrence(s), if any, from history stored onboard and, if present, extract weightage (Block 525). For instance, the obstacle function 415C may store previously detected new objects in the history or store new objects detected by other vehicles 300 (and broadcast by the cloud service 205) in the history. The history may be a part of the obstacle database 356 with an indication that the particular objects have not been confirmed by the database provider as an obstacle. The previously stored new objects may include a weightage (as computed by the cloud service 205, discussed below), which may be extracted by the obstacle function 415C.

The obstacle function 415C may then proceed to transmit a new object message to the cloud service 205 (Block 530). For instance, the obstacle function 415C may generate the new object message and transmit the new object message to the cloud service 205 via the communications system 306. To generate the new object message, the obstacle function 415C may compile the new object message with a copy of the vehicle state information and one or more of: the imaging data associated with the new objects, the object features for the new objects, and/or the image features for the new objects (referred to as "unknown object information"). The obstacle function 415C may store the unknown object information in the history discussed above. Note, an obstacle function 415C of another vehicle 300 may have previously transmitted a new object message for this new object to the cloud service 205 as well (Block 535).

The cloud service 205 may receive the new object message from the obstacle function 415C (e.g., via the communications systems 306). The cloud service 205 may then proceed to check if other instances of the new object(s) have been reported earlier by another vehicle (either the vehicle 300 previously or other vehicle 300) (Block 540). For instance, the cloud service 205 may store new object files in a cloud database for new objects detected and reported the vehicle 300 and other vehicles 300. The new object files may include previously reported new object messages or the constituent components thereof. The cloud service 205 may then determine whether any of the stored new object files correspond to a same new object as indicated in the new object message. If any of the stored new object files correspond to the same new object, the cloud service 205 may extract the stored new object files.

The cloud service 205 may then proceed to assign weightages to the new object(s) accordingly (Block 545). For instance, the cloud service 205 may set the new object message and each, if any, new object files, as an iteration; (optionally) assign identifications (IDs) to each iteration; search image pixels of each iteration for frequent occurred image pixels patterns (frequent occurred image pixels patterns may be templates (e.g., for buildings, structures, etc.), to check for common shapes/edges/geometries/etc., and/or extracted pixel patterns from one or more of the iterations, to check for agreement between iterations); determine occurrence numbers for the image pixels for the frequent occurred image pixel patterns across all iterations based on the search; assign the occurrence numbers to corresponding image pixels (e.g., to the image pixels that make up a match to the frequent occurred image pixel patterns); determine whether any occurrence number, for the image pixels, is above an occurrence threshold; in response to an occurrence number being above the occurrence threshold, retain the image pixels that have occurrence numbers for frequent occurred image pixel patterns above the threshold; and determine the weightage by averaging the occurrence numbers for the retained image pixels. Additionally, the cloud service 205 may make adjustments to the image pixels (for each iteration) based on a location, altitude or orientation of the onboard sensors 410 for each iteration, so that differences of location, altitude or orientation between the iterations does not degrade with the weightage computation.

The cloud service 205 may then proceed to broadcast a local message to all local vehicles (Block 550). For instance, the cloud service 205 may generate the local message and transmit the local message to vehicles 300 within a threshold range of the new object or expected to travel near (e.g., within the threshold range) of the new object. To generate the local message, the cloud service 205 may compile the local message to include a position of the new object and object features for the new object. To determine the local vehicles, the cloud service 205 may have copies of flight plans or track a position of each vehicle, and determine local vehicles as those that are within the threshold range or will be on the flight plan.

The obstacle function 415C may receive the broadcast local message from the cloud service 205. The obstacle function 415C may then proceed to calculate an average weightage of onboard and received from cloud weightages (Block 555). For instance, the obstacle function 415C may retrieve the weightage stored in the history and calculate an average of the stored weightage and the weightage in the local message. The obstacle function 415C may then proceed to store the average weightage in the obstacle DB (e.g., in the history, if the first time, or update the history, if already stored) (Block 560).

The obstacle function 415C may then proceed to perform at least one action based on the weightage (Block 565). For instance, the obstacle function 415C may, based on the weightage of the unknown object, output an alert, display an indicator, update flight plans of the vehicle, and/or update navigation computations. The obstacle function 415C may then proceed to return to obtain vehicle state information and sensor data (Block 505) to start the process over again with new data.

For instance, the obstacle function 415C may output an alert for the new object if a trigger condition indicates the vehicle 300 is too close to the object or will be (e.g., based on current speed and heading, or the flight plan indicates a path to close to the new object). The trigger condition may be adjustable based on the weightage of the unknown object. For instance, for higher weightages, the obstacle function 415C may allow the vehicle 300 to get closer to the new object than lower weightages, as a confidence regarding the position and geometry of the new object is more certain. On the other hand, for new objects with a lower weightage, a confidence regarding the position and geometry is less certain, so more separation may be needed.

For instance, the obstacle function 415C may display an indicator of the new object when the vehicle 300 is approaching the new object. The display may also display other new objects and known objects, e.g., on a digital map. The new objects (e.g., those not yet confirmed) may be displayed in a different manner from known objects. For instance, new objects may be displayed in a different color from the known objects, so that users may have increased situation awareness (e.g., the system 400 has less confidence regarding new objects than known objects).

For instance, the obstacle function 415C may update flight plans of the vehicle and the navigation computations by informing the flight routing program 344, so that the planned flight path 340 and the unplanned flight path 342 may be updated in accordance with the weightage. For instance, as indicated above, a higher weightage new obstacle may allow the vehicle 300 to approach the new object in a closer manner than a lower weightage new object. Therefore, the vehicle 300 may provide more efficient navigation, as the vehicle 300 may perform differentiated actions in accordance with the weightages of the new objects.

Note, after assigning weightages to the new object(s) accordingly (Block 545), the cloud service 205 may also then proceed to determine whether the assigned weightages are greater than a provider threshold (Block 570). For instance, the cloud service 205 may compare the weightage to the provider threshold to determine whether a confidence regarding a new object is high enough to update the obstacle database 356 of every vehicle 300, instead of only the local vehicles.

In response to determining the assigned weightages are above a threshold (Block 570: Yes), the cloud service 205 may also then proceed to transmit a database provider message to a database provider (Block 575) and store the new object for future processing (Block 580). For instance, the cloud service 205 may generate the database provider message by compiling the database provider message to include all iterations in the cloud database (or the constitution components thereof), so the database provider may verify and/or generate a database entry for the new object.

In response to determining the assigned weightages are above a threshold (Block 570: Yes), the cloud service 205 may also then proceed to only store the new object for future processing (Block 580). For instance, to store the new object for future processing, the cloud service 205 may update the cloud database to include the new object message as a new object file (e.g., as another iteration).

Therefore, the methods and systems of the present disclosure increase safety, reduce bandwidth consumption, reduce onboard storage, and provide more efficient navigation. As the vehicles 300 report new objects, along with imaging data (or object features thereof), the cloud service 205 is above to determine a multi-source weightage to determine a confidence regarding a position and geometry of a new object. The cloud service 205 may then report the new object to local vehicles only, which may then increase safety (by issuing alerts), increase situation awareness (by displaying differentiated indicators, and increase efficient navigation (by updating flight planning and navigation computations). The cloud service 205 may also report new objects that have a high confidence to a database provider so that an update my generated for all vehicles 300, when an object is confirmed to be an obstacle.

Figure 6:
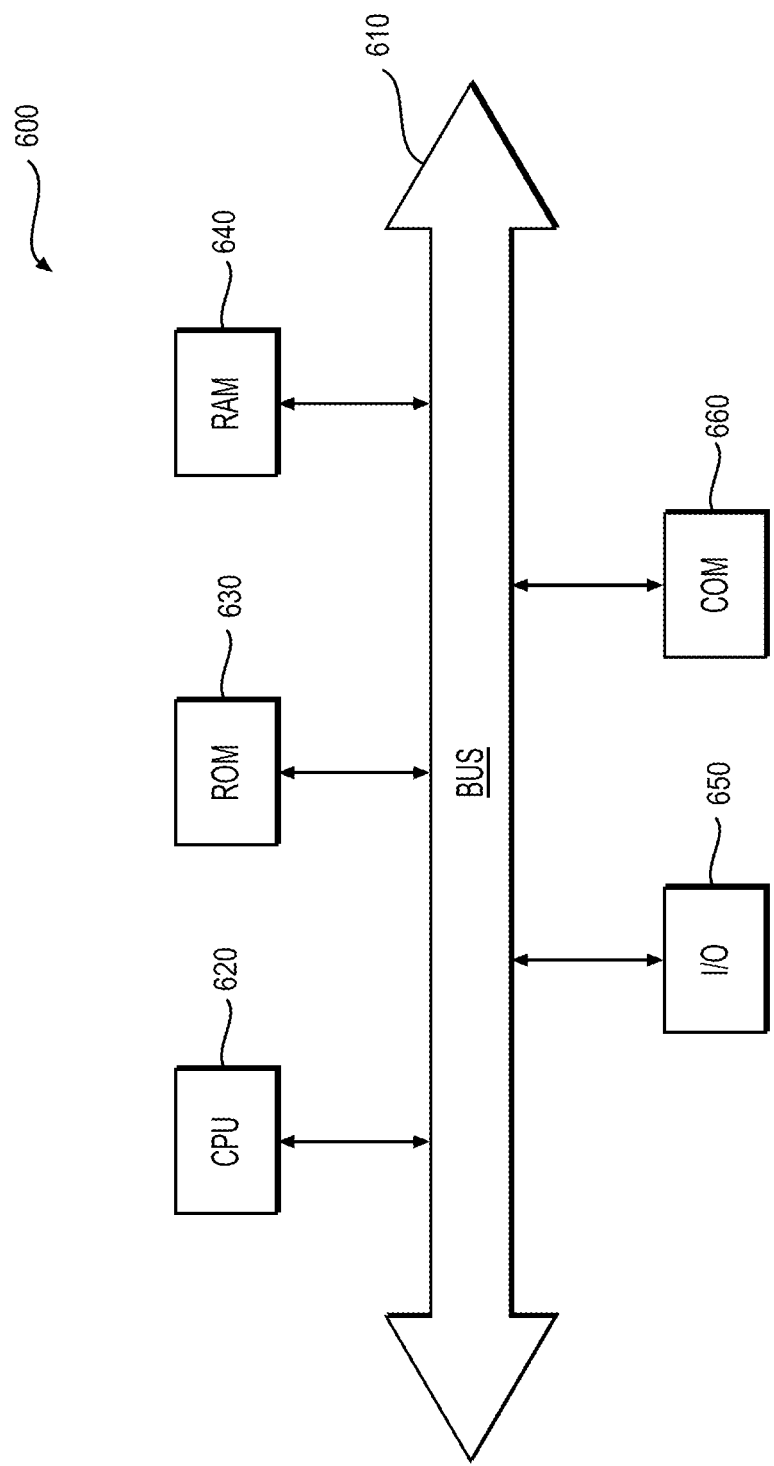
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, comprising:
    obtaining vehicle state information for a vehicle, the vehicle state information including position, speed, heading, and/or orientation data for the vehicle;
    obtaining sensor data from one or more sensors onboard the vehicle; the one or more sensors scanning an environment external to the vehicle;
    processing the sensor data to detect objects including object features for each detected object;
    responsive to a detection of an object, determining whether the object is a known object or an unknown object based on the object features and known objects indicated by the vehicle state information and an obstacle database;
    responsive to a determination that the object is an unknown object, assigning an on-board weightage to the unknown object based at least in part on one or more earlier instances of reports of the unknown object stored in the obstacle database, updating the obstacle database with unknown object information, and transmitting the unknown object information to an off-board service;
    receiving a response from the off-board service, the response including an off-board weightage assigned to the unknown object based at least in part on one or more earlier instances of reports of the unknown object from other vehicles;
    updating the obstacle database with an updated weightage assigned to the unknown object, the updated weightage calculated based on the on-board weightage and the off-board weightage; and
    performing at least one action based on the updated weightage of the unknown object.

2. The computer-implemented method of claim 1, wherein performing the at least one action based on the updated weightage of the unknown object includes:
    performing, based on the updated weightage of the unknown object, one or more of: (1) outputting an alert; (2) displaying an indicator; (3) updating flight plans of the vehicle; and/or (4) updating navigation computations.

3. The computer-implemented method of claim 1, wherein processing the sensor data to detect objects including the object features for each detected object includes:
    detecting objects using a machine vision function; and
    for detected objects, extracting object features from imaging data of the sensor data.

4. The computer-implemented method of claim 3, wherein determining whether the object is a known object or an unknown object includes:
    determining the known objects by extracting the known objects from the obstacle database;
    comparing the detected objects with the known objects;
    in response to a comparison result indicating a match, determining the detected object is a known object; and
    in response to the comparison result indicating no match, determining the detected object is an unknown object.

5. The computer-implemented method of claim 4, wherein comparing the detected objects with the known objects includes:
    comparing object features of the detected object to object features of the extracted known objects to determine whether the object features match.

6. The computer-implemented method of claim 1, wherein the off-board service assigns weightages to new object by:
    obtaining all iterations associated with the unknown object;
    searching image pixels of each iteration for frequent occurred image pixels pattern;
    determining occurrence numbers for the image pixels for the frequent occurred image pixel patterns across all iterations based on the search;
    assigning the occurrence numbers to corresponding image pixels;
    determining whether any occurrence number, for the image pixels, is greater than an occurrence threshold;
    in response to an occurrence number being above the occurrence threshold, retaining the image pixels that have occurrence numbers for frequent occurred image pixel patterns greater than the threshold; and
    determining the weightage by averaging the occurrence numbers for the retained image pixels.

7. The computer-implemented method of claim 6, wherein the off-board service makes adjustments to the image pixels for each iteration based on a location, altitude or orientation of onboard sensors for each iteration.

8. A system, the system comprising:
    at least one memory storing instructions; and
    at least one processor executing the instructions to perform a process, the process including:
        obtaining vehicle state information for a vehicle, the vehicle state information including position, speed, heading, and/or orientation data for the vehicle;
        obtaining sensor data from one or more sensors onboard the vehicle; the one or more sensors scanning an environment external to the vehicle;

processing the sensor data to detect objects including object features for each detected object;

responsive to a detection of an object, determining whether the object is a known object or an unknown object based on the object features and known objects indicated by the vehicle state information and an obstacle database;

responsive to a determination that the object is an unknown object, assigning an on-board weightage to the unknown object based at least in part on one or more earlier instances of reports of the unknown object stored in the obstacle database, updating the obstacle database with unknown object information and transmitting the unknown object information to an off-board service;

receiving a response from the off-board service, the response including an off-board weightage assigned to the unknown object based at least in part on one or more earlier instances of reports of the unknown object from other vehicles;

updating the obstacle database with an updated weightage assigned to the unknown object; and performing at least one action based on the updated weightage of the unknown object.

9. The system of claim 8, wherein performing the at least one action based on the updated weightage of the unknown object includes:

performing, based on the updated weightage of the unknown object, one or more of: (1) outputting an alert; (2) displaying an indicator; (3) updating flight plans of the vehicle; and/or (4) updating navigation computations.

10. The system of claim 8, wherein processing the sensor data to detect objects including the object features for each detected object includes:

detecting objects using a machine vision function; and for detected objects, extracting object features from imaging data of the sensor data.

11. The system of claim 10, wherein determining whether the object is a known object or an unknown object includes:

determining the known objects by extracting the known objects from the obstacle database;

comparing the detected objects with the known objects;

in response to a comparison result indicating a match, determining the detected object is a known object; and in response to the comparison result indicating no match, determining the detected object is an unknown object.

12. The system of claim 11, wherein comparing the detected objects with the known objects includes:

comparing object features of the detected object to object features of the extracted known objects to determine whether the object features match.

13. The system of claim 8, wherein the off-board service assigns weightages to new object by:

obtaining all iterations associated with the unknown object;

searching image pixels of each iteration for frequent occurred image pixels pattern;

determining occurrence numbers for the image pixels for the frequent occurred image pixel patterns across all iterations based on the search;

assigning the occurrence numbers to corresponding image pixels;

determining whether any occurrence number, for the image pixels, is greater than an occurrence threshold;

in response to an occurrence number being above the occurrence threshold, retaining the image pixels that have occurrence numbers for frequent occurred image pixel patterns greater than the threshold; and determining the weightage by averaging the occurrence numbers for the retained image pixels.

14. The system of claim 13, wherein the off-board service makes adjustments to the image pixels for each iteration based on a location, altitude or orientation of onboard sensors for each iteration.

15. A non-transitory computer-readable medium storing instructions that, when executed by a processor, cause the processor to perform a method, the method comprising:

obtaining vehicle state information for a vehicle, the vehicle state information including position, speed, heading, and/or orientation data for the vehicle;

obtaining sensor data from one or more sensors onboard the vehicle; the one or more sensors scanning an environment external to the vehicle;

processing the sensor data to detect objects including object features for each detected object;

responsive to a detection of an object, determining whether the object is a known object or an unknown object based on the object features and known objects indicated by the vehicle state information and an obstacle database;

responsive to a determination that the object is an unknown object, assigning an on-board weightage to the unknown object based at least in part on one or more earlier instances of reports of the unknown object stored in the obstacle database, updating the obstacle database with unknown object information and transmitting the unknown object information to an off-board service;

receiving a response from the off-board service, the response including an off-board weightage assigned to the unknown object based at least in part on one or more earlier instances of reports of the unknown object from other vehicles;

updating the obstacle database with an updated weightage assigned to the unknown object, the updated weightage calculated based on the on-board weightage and the off-board weightage; and performing at least one action based on the updated weightage of the unknown object.

16. The non-transitory computer-readable medium of claim 15, wherein performing the at least one action based on the updated weightage of the unknown object includes:

performing, based on the updated weightage of the unknown object, one or more of: (1) outputting an alert; (2) displaying an indicator; (3) updating flight plans of the vehicle; and/or (4) updating navigation computations.

17. The non-transitory computer-readable medium of claim 15, wherein processing the sensor data to detect objects including the object features for each detected object includes:

detecting objects using a machine vision function; and for detected objects, extracting object features from imaging data of the sensor data.

18. The non-transitory computer-readable medium of claim 17, wherein determining whether the object is a known object or an unknown object includes:

determining the known objects by extracting the known objects from the obstacle database;

comparing the detected objects with the known objects;

in response to a comparison result indicating a match, determining the detected object is a known object; and in response to the comparison result indicating no match, determining the detected object is an unknown object.

19. The non-transitory computer-readable medium of claim 15, wherein the off-board service assigns weightages to new object by:
- obtaining all iterations associated with the unknown object;
- searching image pixels of each iteration for frequent occurred image pixels pattern;
- determining occurrence numbers for the image pixels for the frequent occurred image pixel patterns across all iterations based on the search;
- assigning the occurrence numbers to corresponding image pixels;
- determining whether any occurrence number, for the image pixels, is greater than an occurrence threshold;
- in response to an occurrence number being above the occurrence threshold, retaining the image pixels that have occurrence numbers for frequent occurred image pixel patterns greater than the threshold; and
- determining the weightage by averaging the occurrence numbers for the retained image pixels.

20. The non-transitory computer-readable medium of claim 19, wherein the off-board service makes adjustments to the image pixels for each iteration based on a location, altitude or orientation of onboard sensors for each iteration.

* * * * *